United States Patent [19]
Adam et al.

[11] Patent Number: 6,000,749
[45] Date of Patent: Dec. 14, 1999

[54] SLATTED SUNROOF FOR A MOTOR VEHICLE

[75] Inventors: Wolfgang Adam, Nagold; Volker Richters, Sindelfingen, both of Germany

[73] Assignee: DaimlerChrysler AG, Stuttgart, Germany

[21] Appl. No.: 09/035,862

[22] Filed: Mar. 6, 1998

[30] Foreign Application Priority Data

Jan. 30, 1998 [DE] Germany .................. 198 03 597

[51] Int. Cl.$^6$ .................................. B60J 7/047
[52] U.S. Cl. ...................... 296/214; 296/220.01
[58] Field of Search .............. 296/214, 220.01, 296/107.06

[56] References Cited

FOREIGN PATENT DOCUMENTS

| 4127387 | 3/1992 | Germany | 296/214 |
| 106374 | 6/1984 | Japan | 296/214 |
| 405178096 | 7/1993 | Japan | 296/220.01 |

*Primary Examiner*—Dennis H. Pedder
*Attorney, Agent, or Firm*—Evenson McKeown Edwards & Lenahan, PLLC

[57] ABSTRACT

A slatted sunroof for a motor vehicle has slats that are lifted and spaced apart at intervals from one another when the roof is open, and in particular are pushed against one another so that their spacing is reduced by contrast with their closed position. A roof liner that is deformable extends, at least when the roof is closed, in an area located below the slats. Fasteners are provided that hold the roof liner against the slats at locations that are regularly spaced and produce an orderly pattern when the roof is opened, especially in the displacement direction of the slats. The sunroof is designed in such fashion that undesired folding of the roof liner because of different degrees of thermal expansion of the roof liner and the slats is prevented. This is accomplished by the fasteners each comprising a retaining element on the slat side and a retaining element on the roof liner side, the retaining elements being connected movably with one another, with the retaining elements on the slat side being fastened to the slats and the retaining elements on the roof liner side being fastened to the roof liner.

27 Claims, 2 Drawing Sheets

SLATTED SUNROOF FOR A MOTOR VEHICLE

BACKGROUND AND SUMMARY OF THE INVENTION

This application claims the priority of foreign application no. 98035971.7 filed in Germany on Jan. 30, 1998, the disclosure of which is expressly incorporated by reference herein.

The invention relates to a slatted sunroof for a motor vehicle, with slats that are lifted and spaced apart from one another when the roof is opened with said slats being pushed against one another to reduce their spacing as compared to their spacing in a roof closed position, and with a roof liner that is deformable and extends in an area located below the slats, at least when the roof is closed, with fasteners being provided that hold the roof liner against the slats at points that are regularly spaced for orderly folding when the roof is opened.

To create a visually attractive appearance, slatted sunroofs of this type are covered on the side facing the vehicle interior with a film that forms the roof liner, said film consisting of plastic in particular and possibly laminated with fabric or other materials. In known slatted sunroofs of this type, this roof liner is deliberately fastened to the slats of the slatted sunroof at points which produce an orderly fold pattern in the roof liner when the slats are pushed together, said slats being raised adjacent to one another. In particular this applies to a fold pattern in which the folds of the roof liner extend into the spaces formed between the raised adjacent slats.

The roof liner is attached to the slats by hook-and-loop fasteners or with adhesive tapes or with adhesive applied in strips.

The slats of such a slatted sunroof usually consist of sheet steel, sheet aluminum, extrusion-molded aluminum sections, and plastic. In contrast to this arrangement, the roof liner as a rule consists of plastic film. Consequently, the slats and roof liner normally exhibit different thermal expansion behavior. As a result of the above-described fastening of the roof liner to the slats, at temperatures that differ from the temperature prevailing at the time the roof liner was attached to the slats, different degrees of thermal expansion can create undesired fold patterns in the roof liner. In addition, different temperatures prevail in the slats, which are exposed to the exterior of the vehicle, than in the roof liner, which is exposed to the vehicle interior, and this can also result in an undesired fold pattern because of the different degrees of thermal expansion involved.

The present invention relates to the problem of providing a slatted sunroof of the species recited at the outset in which no fold formation in the roof liner takes place because of different degrees of thermal expansion in the slats and the roof liner.

This problem is solved according to the invention by a slatted sunroof, wherein the fasteners each have a retaining element on the slat side and a retaining element on the roof liner side, said retaining elements being connected with one another so that they are movable with respect to one another, with the retaining elements on the slat side being fastened to the slats and the retaining elements on the roof liner side being fastened to the roof liner.

The invention is based on the general idea of fastening the roof liner to the slats in way that permits relative movement between the roof liner and the slats. It is proposed for this purpose to use fasteners formed by two structural elements that are displaceable with respect to one another, with one element being fastened to the slats and the other element being fastened to the roof liner. This separation into two separate elements makes it possible to make the element to be fastened to the slats from the same material as the slats themselves, or from a material with a thermal expansion behavior that is approximately the same as that of the slat material, and to make the element to be fastened to the roof liner from the same material as the roof liner or from a material that undergoes approximately the same degree of thermal expansion as the roof liner material. In this way, no relative movements caused by temperature changes in the roof liner and in the slats and/or caused by temperature differences between the roof liner and the slats can occur between the roof liner and the element of the fasteners fastened thereto or between a slat and the element of the fasteners fastened thereto. All relative movements take place between the two elements of the fasteners and are compensated there by the connection formed between those elements of the fasteners that permit relative movement. Undesired folding caused by extreme temperature conditions is therefore no longer possible over a wide temperature range.

In one especially advantageous embodiment of the slatted sunroof according to the invention, the retaining element of the fasteners on the slat side can be in the form of a wire or rod that runs transversely to the sliding direction of the slats and is fastened to the individual slats, not over their entire lengths but especially pointwise at a plurality of locations distributed over the length of the rod. The retaining element of the fasteners on the roof liner side is designed as tubular loops into which the corresponding rod is inserted. At the point where the rod is fastened to the respective slat, the loop has cutouts facing the slats, through which cutouts the rod is connected to the respective slat.

Embodiments of the loop fastened to the roof liner and suggestions for fastening the rods to the slats, as well as additional advantages and important features of the slatted sunroof according to the invention, are provided in the claims, drawings, and the following description of preferred embodiments with reference to the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
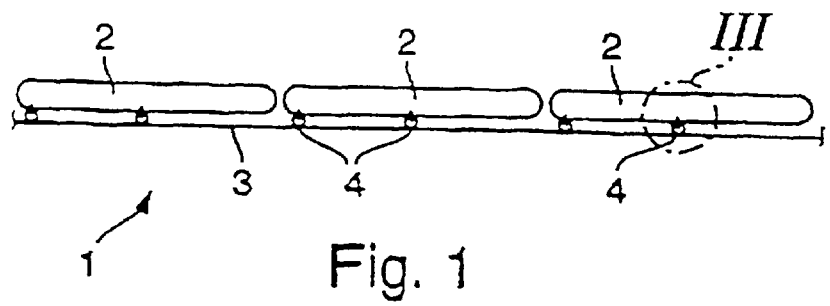
FIG. 1 is a schematic sectional view of a slatted sunroof constructed according to a preferred embodiment of the invention shown in the closed state.
Figure 2:
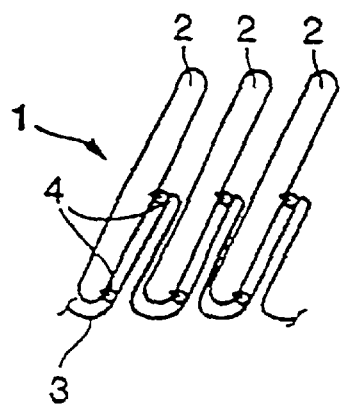
FIG. 2 is a schematic side view of the slatted sunroof in FIG. 1, but shown in the open state.

According to FIGS. 1 and 2, a slatted sunroof 1 according to the invention is formed by a plurality of slats 2 extending parallel to one another and arranged side by side, with roof 1 being closed in FIG. 1. To open slatted sunroof 1, slats 2 can be pushed against one another, causing them to rise as their mutual spacing is reduced as shown in FIG. 2. On their interior facing the vehicle interior, a roof liner 3 is attached to slats 2, said liner extending along slats 2 when the slatted sunroof 1 is in the closed position (see FIG. 1).

Roof liner 3 is attached to slats 2 by fasteners 4 described in greater detail below, said fasteners being so positioned that roof liner 3 creates folds when slatted sunroof 1 is opened, said folds being pulled into the spaces formed between slats 2 as they rise (see FIG. 2).

As shown in FIGS. 3 to 7, a fastener 4, by which roof liner 3 is attached to slats 2, is formed by two separate retaining elements 5 and 6, of which one retainer in the embodiments shown is designed as a rod 5 that extends parallel to slats 2 and transversely to their displacement direction. The other retainer is formed in the embodiments shown as a tubular loop 6 (6A,6B,6C), said loop surrounding rod 5 essentially completely.

Figure 3:
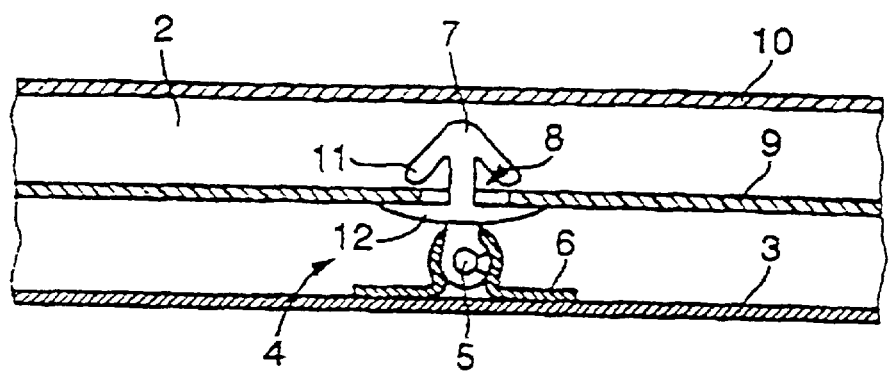
FIG. 3 is an enlarged view of an area III in FIG. 1 in which a retaining element of a fastener designed as a rod is fastened to a slat.

A plurality of fastening elements 7 as shown in FIG. 3 is fastened along rods 5, spaced apart from one another. One such fastening element 7 can be welded to rod 5 for example, or pushed onto said rod. In the embodiment shown in FIG. 3, a fastening element of this kind is designed as a clip 7 whose free end has barbs 11 and can be inserted into an opening 8 in an underside 9 of corresponding slat 2. During the insertion process, barbs 11 of fastening element 7 are engaged behind the marginal area of opening 8, thus joining fastening element 7 and rod 5 fastened thereto. Slats 2 are hollow between lower side 9 and upper side 10.

Opposite barbs 11, a counterbearing disk 12 is provided, said disk abutting lower side 9 of slat 2 opposite barbs 11 in the marginal area of opening 8 when clip element 7 is clipped to slat 2.

Figure 4:
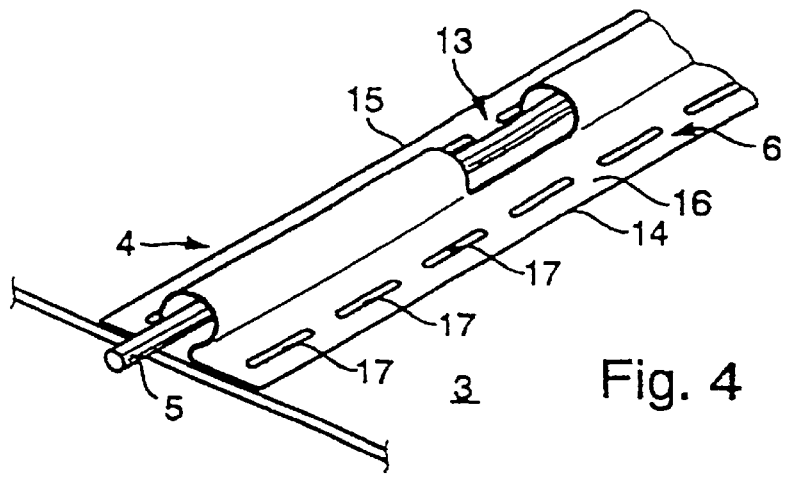
FIG. 4 is a perspective view of a retaining element of the fastener designed as a loop, fastened to a roof liner.

According to FIG. 4, cutouts 13 are provided in loop 6 at those points at which one of fastening elements 7 is fastened to rod 5, said cutouts opening toward slats 2, through which cutouts rod 5 can be fastened at the fastening locations provided on the respective associated slats 2. In FIG. 4 however the corresponding fastening element 7 has not yet been mounted on rod 5.

In the embodiment corresponding to FIG. 4, loop 6 is formed by virtue of the fact that a strip-shaped band of material 16 is driven or tucked between its long sides 14 and 15 against slats 2. In the example shown, long sides 14 and 15 of material band 16 are glued or welded at several points 17 to roof liner 3 on the side of roof liner 3 facing slats 2. With a plastic film as roof liner 3 and with a material band 16 made of plastic, especially a material band 16 made of the same material as roof liner 3, the film can be welded in an especially advantageous manner.

It is especially clear in the view shown in FIG. 4 that roof liner 3 can move relative to slats 2, since the elements of fasteners 4, namely rod 5 and loop 6, are displaceable relative to one another. This displaceability allows relative movement of rod 5 in the lengthwise direction depending on the dimensions of cutouts 13 and transversely relative to rod 5 depending on the opening width of loop 6. By suitable selection of material combinations for rod 5 and slats 2 as well as material band 16 and roof liner 3, undesired folding of roof liner 3 caused by extreme temperatures and/or temperature differentials can be prevented despite different degrees of thermal expansion of slats 2 and roof liner 3.

Figure 5:
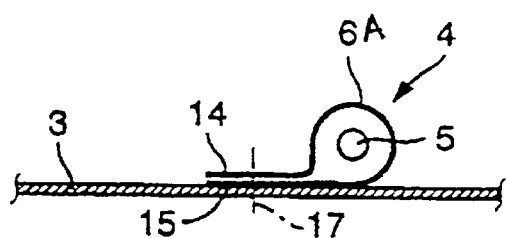
FIGS. 5, 6, and 7 each show cross sections through various designs for the loops of the retainers on the roof liner side.

In an embodiment according to FIG. 5, loop 6A is formed by virtue of the fact that long side 14 is folded over and placed so that it approximately matches long side 15. Fastening, especially by the film welding method, can then be performed along loop 6A in the area where the material overlaps.

Figure 6:
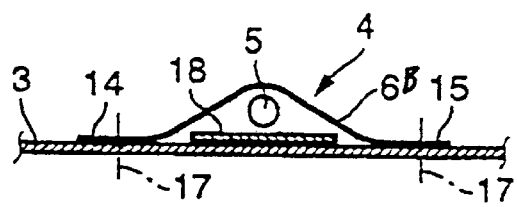

In the embodiment according to FIG. 6, a channel-shaped loop 6B is formed that essentially corresponds to loop 6 in FIG. 4, but a smaller area of material band 16 has been inserted. In the embodiment in FIG. 6, a cushion 18 or the like is also placed on roof liner 3 or fastened thereto below rod 5 in order to prevent damage to roof liner 3 by rod 5 for example.

Figure 7:
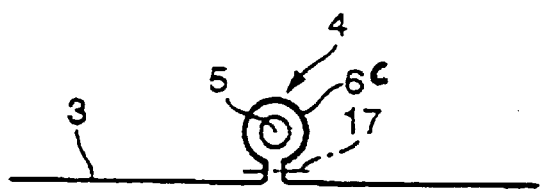

In an especially simple embodiment corresponding to FIG. 7, loop 6C is formed by the material of roof liner 3 itself, with this material being inserted or tucked in at the appropriate locations relative to slats 2. As a result, the areas of roof liner 3 that adjoin each other once again following the enclosing of rod 5 are fastened to one another, especially by welding or sewing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Slatted sunroof for a motor vehicle, with slats that are lifted and spaced apart from one another when the roof is opened with said slats being pushed against one another to reduce their spacing as compared to their spacing in a roof closed position, and with a roof liner that is deformable and extends in an area located below the slats, at least when the roof is closed, with fasteners being provided that hold the roof liner against the slats at points that are regularly spaced for orderly folding when the roof is opened, wherein the fasteners each have a retaining element on the slat under side and a retaining element on the roof liner upper side, said retaining elements being connected with one another so that they are movable with respect to one another, with the retaining elements on the slat under side being fastened to the slats and the retaining elements on the roof liner upper side being fastened to the roof liner.

2. Slatted sunroof according to claim 1, wherein respective ones of the retaining elements on the roof liner side are made from one of the same material as the roof liner and a material that exhibits approximately the same thermal expansion behavior as the material of the roof liner.

3. Slatted sunroof according to claim 1, wherein respective ones of the retaining elements on the slat under side are made in the form of a wire or rod extending transversely to a displacement direction of the slats.

4. Slatted sunroof according to claim 1, wherein respective ones of the retaining elements on the slat under side are made in the form of a rod extending transversely to the direction of the slates, and wherein respective ones of the retaining elements on the roof liner upper side are designed as a loop in the form of a tube that surrounds the rod, with said loop having a plurality of cutouts opening toward the slats along the rod, through which cutouts the rod is fastened to the respective slat.

5. Slatted sunroof according to claim 2, wherein respective ones of the retaining elements on the slat under side are made in the form of a rod extending transversely to the direction of the slates, and wherein respective ones of the retaining elements on the roof liner upper side are designed as a loop in the form of a tube that surrounds the rod, with said loop having a plurality of cutouts opening toward the slats along the rod, through which cutouts the rod is fastened to the respective slat.

6. Slatted sunroof according to claim 4, wherein the loop is formed by a portion of the roof liner folded inward, with adjoining sections of this area of the roof liner being fastened to one another.

7. Slatted sunroof according to claim 4, wherein the loop is made of a strip-shaped material band fastened to the roof liner at its long sides.

8. Slatted sunroof according to claim 5, wherein the loop is made of a strip-shaped material band fastened to the roof liner at its long sides.

9. Slatted sunroof according to claim 7, wherein the loop is formed by connecting long sides of the band at opposite sides of the loop to the roof liner.

10. Slatted sunroof according to claim 9, wherein a cushion is located between the long sides of the material band between the roof liner and the rod.

11. Slatted sunroof according to claim 6, wherein the loop is formed by folding the long sides so that they rest on one another so that they match.

12. Slatted sunroof according to claim 4, wherein the loop is fastened with the liner by one of gluing and film welding.

13. Slatted sunroof according to claim 6, wherein the loop is fastened with the liner by one of gluing and film welding.

14. Slatted sunroof according to claim 7, wherein the loop is fastened with the liner by one of gluing and film welding.

15. Slatted sunroof according to claim 8, wherein the loop is fastened with the liner by one of gluing and film welding.

16. Slatted sunroof according to claim 9, wherein the loop is fastened with the liner by one of gluing and film welding.

17. Slatted sunroof according to claim 10, wherein the loop is fastened with the liner by one of gluing and film welding.

18. Slatted sunroof according to claim 11, wherein the loop is fastened with the liner by one of gluing and film welding.

19. Slatted sunroof according to claim 4, wherein clip elements are fastened to the rod, said clip elements being clippable through said cutouts in the loop in matching clip receptacles in the respective slats.

20. Slatted sunroof according to claim 5, wherein clip elements are fastened to the rod, said clip elements being clippable through said cutouts in the loop in matching clip receptacles in the respective slats.

21. Slatted sunroof according to claim 6, wherein clip elements are fastened to the rod, said clip elements being clippable through said cutouts in the loop in matching clip receptacles in the respective slats.

22. Slatted sunroof according to claim 7, wherein clip elements are fastened to the rod, said clip elements being clippable through said cutouts in the loop in matching clip receptacles in the respective slats.

23. Slatted sunroof according to claim 8, wherein clip elements are fastened to the rod, said clip elements being clippable through said cutouts in the loop in matching clip receptacles in the respective slats.

24. Slatted sunroof according to claim 9, wherein clip elements are fastened to the rod, said clip elements being clippable through said cutouts in the loop in matching clip receptacles in the respective slats.

25. Slatted sunroof according to claim 10, wherein clip elements are fastened to the rod, said clip elements being clippable through said cutouts in the loop in matching clip receptacles in the respective slats.

26. Slatted sunroof according to claim 11, wherein clip elements are fastened to the rod, said clip elements being clippable through said cutouts in the loop in matching clip receptacles in the respective slats.

27. Slatted sunroof according to claim 12, wherein clip elements are fastened to the rod, said clip elements being clippable through said cutouts in the loop in matching clip receptacles in the respective slats.

\* \* \* \* \*